Dec. 23, 1930. M. FOURMENT 1,786,202
APPARATUS FOR HIGH TEMPERATURE TREATMENT OF ORES AND OTHER SUBSTANCES
Filed Dec. 22, 1926
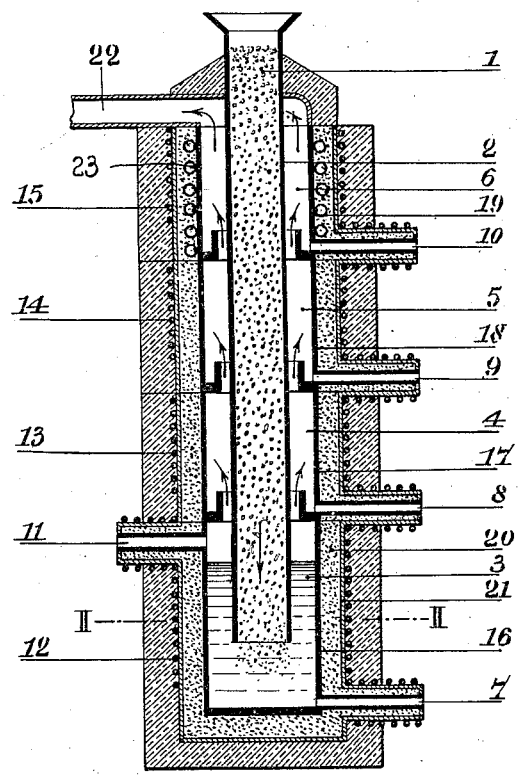
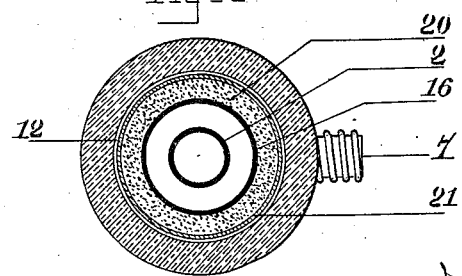
Inventor
Marcel Fourment,
by A. B Foster
his attorney Patented Dec. 23, 1930

1,786,202

UNITED STATES PATENT OFFICE

MARCEL FOURMENT, OF PARIS, FRANCE

APPARATUS FOR HIGH-TEMPERATURE TREATMENT OF ORES AND OTHER SUBSTANCES

Application filed December 22, 1926, Serial No. 156,425, and in France February 2, 1926.

The present invention has for its object a process of treatment of ores, wastes, oxides, metals, alloys, etc., consisting in raising them to a high temperature by high frequency induction currents, in volatilizing at least partially these materials and collecting the condensable volatilized or dissociated parts, either in the liquid state or the pulverulent state.

It relates also to the particular application of this process to various particular cases such as the preparation of metals in powder form, the treatment of certain ores (lead, zinc etc.,) the treatment of metallic wastes by fractional distillation, the dissociation of oxides at very high temperatures, the obtention of certain carbides such as carborundum, etc.

The present invention has also for its object an apparatus for carrying out the above process, consisting of a principal crucible for the fusion and volatilization of materials to be treated, and one or more secondary crucibles designed to collect the condensed vapours, the principal crucible and the secondary crucible or crucibles each being provided with an inductor winding adapted to be connected to a source of high frequency electric currents for heating and also being provided if necessary with means for cooling the said crucibles.

Preferably the apparatus comprises discharge pipes for the liquid collected in the crucibles, surrounded with an inductor winding adapted to be connected to a source of high frequency electric currents for facilitating the flow of the liquefied materials.

The apparatus can comprise also, on the principal crucible, a discharge pipe for dross lighter than the bath of melted material, also provided with an induction winding adapted to be connected to a source of high frequency electric current.

A particularly advantageous embodiment comprises around a central supply tube for the materials to be treated an annular space provided with landing stages forming the secondary crucibles, the provision of separate windings about each stage enabling fractional distillation of the volatilized elements to be effected.

By way of example, an apparatus according to the present invention is shown in the annexed drawings.

Figure 1, is a view in vertical section of this apparatus.

Figure 2 is a view in section on the line II—II of Figure 1.

In the apparatus illustrated, the mixture 1, which it is desired to treat, is introduced by a refractory pipe 2 into the principal crucible 3. The apparatus comprises above this, crucibles 3, three secondary crucibles 4, 5 and 6; outlet pipes 7, 8, 9 and 10 each having an induction winding designed to raise the interior lining of each pipe to the desired temperature. The tube 11 leading from the upper part of the principal crucible 3 is intended for the discharge of dross or light un- volatilized products. Inductor windings 12, 13, 14, 15 permit the crucibles 3, 4, 5 and 6 each to be raised to the desired temperatures, the highest temperature being reached in the carbon lining 16 of the principal crucible 3. The tubular windings 13, 14 and 15 can be used (or some of them can be used) as cooling coils only, if desired, for cooling the respective crucibles or compartments 4, 5 and 6. The secondary crucibles also have carbon linings 17, 18 and 19 but these have in their lower parts an annular space for the passage of the vapours from the next lower crucible and a circular gutter for the collection of the products of condensation; between the carbon linings and the inductor windings, there are provided a heat insulating envelope 20 and a dielectric envelope 21. Finally the upper part of the apparatus comprises a pipe 22 intended to discharge the uncondensable gases and the condensed vapours into a recovery chamber which is not illustrated in the drawings, and where the filtration of the solid condensed products in suspension, from the uncondensable gases can be effected.

The operation of the apparatus is continuous. The mixture 1 to be treated descends in a continuous fashion by the central pipe 2 and the different products are discharged in a continuous fashion by the pipes 7, 8, 9, 10 and 11. In the case of low delivery the operation can nevertheless be rendered intermittent.

It is evident that if considered useful the whole or part of the secondary crucibles 4, 5, 6 can be cooled instead of heated. At 23 is illustrated a cooling coil, for cooling the crucible 6. Further, the electric windings could be placed at any other convenient point.

The apparatus thus described permits various operations to be effected, as the following:

(a) *Preparation of metals in powder.*—For this purpose the metal is fed in by the central tube 2 and the secondary crucibles 4, 5 and 6 strongly cooled. The metal is then collected in powder. In this arrangement powdered lead, tin, aluminium, zinc, etc., can be prepared.

(b) *Treatment of ores.*—For this purpose the mixture of ore with the appropriate fluxes and reducing agents is fed into the central tube 2 and the metal or metals contained therein are collected either in the principal crucible or in the secondary crucibles. The method can also be applied to the treatment of complex ores such as those of lead and zinc by forming a melting bath rich in lime; the lead is collected in the lower part of the principal crucible while the zinc is collected in the secondary crucibles.

(c) *Treatment of wastes.*—Wastes containing various metals having different boiling points can be fed into the apparatus, as for example wastes of bronze, brass, tin antimony, lead etc. The least volatile metal remains in the principal crucible, the others condense on the secondary crucibles.

(d) *Preparation of various substances.*—A mixture of pure sand and carbon is fed into the central tube and very pure and very finely divided total carbide of silicon (carborundum) is collected in the secondary crucibles. Oxides which are reduced or dissociated at very high temperatures can be treated in the same way.

It should be mentioned that the apparatus can also be applied if the treatment of the materials must be effected either under superatmospheric or subatmospheric pressure, either in a neutral or active atmosphere.

I claim:

1. Apparatus in which substances can be volatilized and collected by condensation comprising a vertical crucible, collecting parts on the inside walls of the crucible at a distance from the lower end, and inductor windings surrounding the crucible, said windings being adapted to form a part of a high frequency electric circuit.

2. Apparatus according to claim 1, in which the collecting parts are provided with discharge pipes surrounded with inductor windings adapted to form a part of a high frequency electric circuit.

3. Apparatus suitable for volatilizing substances including metals of different boiling points, which comprises a vertical crucible divided into compartments by collecting parts carried on the inner walls of the crucible, located at different heights in the crucible, a substantially vertical feed pipe for introducing material to be treated, into the bottom part of said crucible, said feed pipe extending through the several compartments in said crucible, said crucible being surrounded by inductor windings, which windings are each substantially horizontal and are adapted to form part of a high frequency electric circuit.

Dated this 9th of December, 1926.

MARCEL FOURMENT.